G. W. Tileston,
Flour Sieve.
Nº 49,200. Patented Aug. 1, 1865.
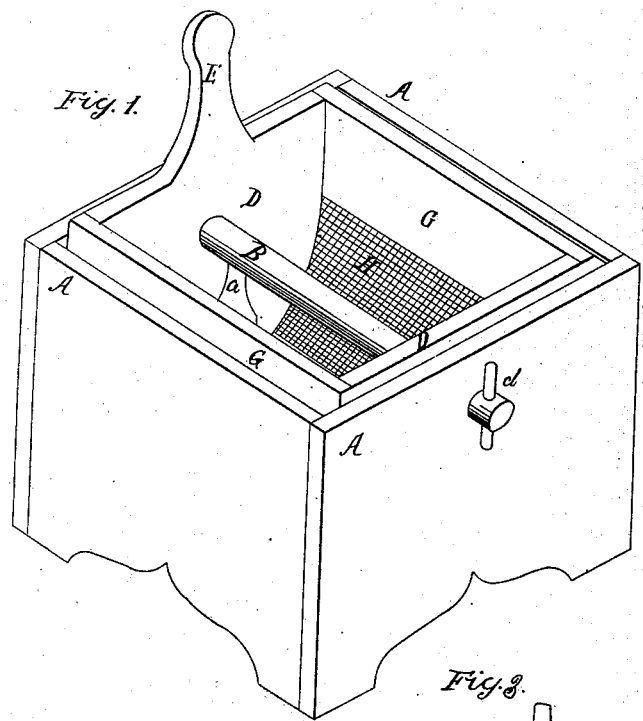
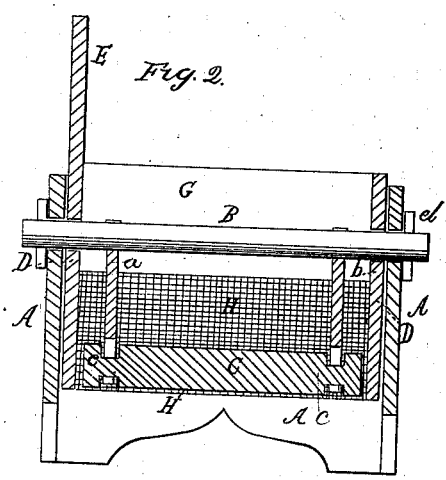
Witnesses.
Asa Wilmot.
R Fitzgerald
Inventor.
George W. Tileston.

UNITED STATES PATENT OFFICE.

GEORGE W. TILESTON, OF NEW HAVEN, CONNECTICUT, ASSIGNOR TO ASA WILMOT, OF SAME PLACE.

FLOUR-SIFTER.

Specification forming part of Letters Patent No. 49,260, dated August 1, 1865.

*To all whom it may concern:*

Be it known that I, GEORGE W. TILESTON, of the city and county of New Haven, in the State of Connecticut, have invented a new and useful Improvement in Flour and Meal Sifters; and I do hereby declare that the following is a full, clear, and exact description of the construction, character, and operation of the same, reference being had to the accompanying drawings, which make part of this specification, in which—

Figure 1 is a perspective view of the sifter complete. Fig. 2 is a section of the same cut vertically through the center in the direction of the axis of its motion. Fig. 3 is a plan of one of the arms viewed in the direction of the axis of the roller.

My improvement consists in attaching a piece of wire cloth or gauze to a wooden frame in a position to form about a semi-cylindrical vessel, and in suspending this vessel on an axis or arbor supported in the opposite sides of an outer wooden box or frame fitted to sit on a table, or in any other vessel, as desired, and in fitting in a roller so that it will crush or pulverize all of the lumps of flour or meal which are in good condition for use, but so as to yield or pass over such lumps as should be thrown out as unfit for family use, (which roller may also assist in forcing the flour or meal through the meshes of the sieve.)

I make the outer box or frame of wood or any other suitable material, substantially of the shape shown at A A A, Fig. 1, and indicated in section at A A A, Fig. 2, and with a rod or bar, as B, passing through it, to sustain and serve as an axis-bar on which the sieve-frame vibrates, as shown in Figs. 1 and 2. This rod or bar B also supports the two arms $a$ and $b$, whose forked ends as $c$, Fig. 3, steady the crushing and pressing roller C, as in Fig. 2.

I make the sieve-frame of two semicircular pieces of wood for the ends, on one of which I have a projecting piece, E, which serves as a handle. To these semicircular ends I attach two slats or strips of wood, as G and G, all of which constitute a suitable frame for the support of the wire-cloth, and I make two holes in the ends to suit the bar B, all as shown in Fig. 1 and indicated in section in Fig. 2. To this frame D G, I attach a suitable piece of wire-cloth, as shown in part at H, Fig. 1, and in section at H and H', Fig. 2, which will form substantially a semi-cylindrical sieve with its bottom extending to H', Fig. 2, thus passing under the yielding roller C, so that the circular vibrations of the sieve will work the roller C in the forks $c$ and $c$ of the arms $a$ and $b$, one of which arms is shown in Fig. 3 in plan at right angles to the axis of the roller C.

I make the roller C, Fig. 2, of wood or any other suitable material, of a suitable size to receive under its periphery such lumps of flour or meal as require crushing, and of suitable weight to crush them, and I turn a groove near each end, as shown, near $c$ and $c$, Fig. 2, by means of which it is held in its proper position at the bottom by the forks $c$ $c$ of the arms $a$ and $b$, in which forks it rises or falls, as the lumps may require.

I make the arms $a$ and $b$ of wood or any other suitable material, substantially in the shape shown in Fig. 3, and secure them to the bar B, as shown, near $a$, Fig. 1, making the space $c$, Fig. 3, between the prongs of sufficient height to allow the roller C sufficient vertical play.

Having made the several parts of the sifter as above described, I place the sieve-frame D G H within the outer box or frame, A A A, pass the bar B through the parts, put in the arms $a$ and $b$, and place the roller C in the forks, and turn the arm downward until the roller C is at the bottom. I then put in the pin or key $d$, which holds the bar B rigidly, and so secures the roller C in its place at the bottom, when the whole will be as represented and indicated in Figs. 1 and 2, and will be ready to receive the flour or meal for sifting; and when the flour or meal is placed in the sifter and the handle E vibrated the motion of the sieve will continually agitate the flour or meal, while the roller C will crush and pulverize the lumps, so that the flour or meal will be rapidly sifted, and without waste.

What I claim as my invention, and desire to secure by Letters Patent, is—

As a new article of manufacture, a flour or meal sifter consisting of a curvilinear vibrating sieve, and a crushing or pulverizing roller, when the whole is constructed and fitted to produce the result substantially as herein described.

GEORGE W. TILESTON.

Witnesses:
ASA WILMOT,
R. FITZGERALD.